March 12, 1929.  W. C. McCOY  1,705,158
ELECTRICAL INDICATING INSTRUMENT
Filed Jan. 21, 1926  2 Sheets-Sheet 1
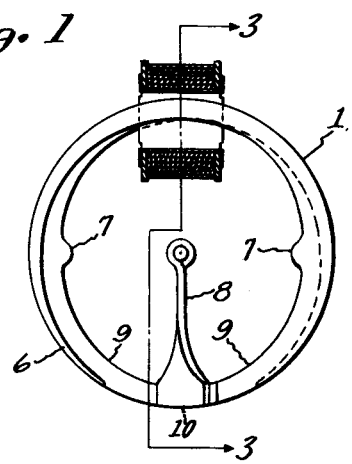
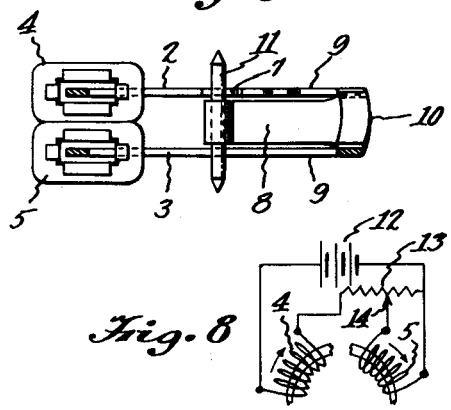
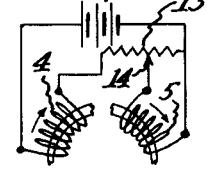
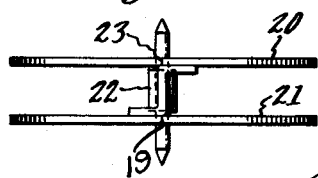
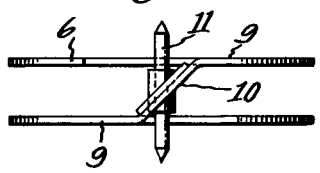
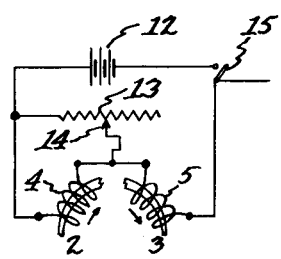
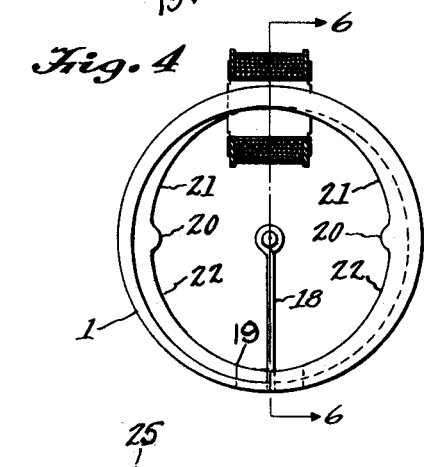
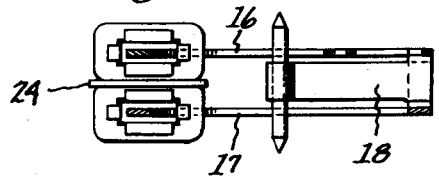
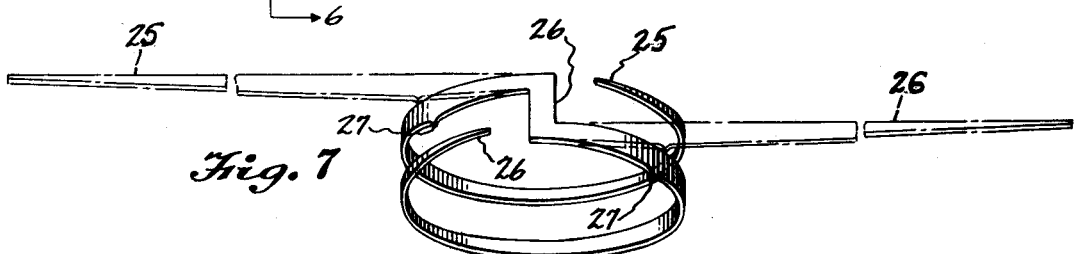
INVENTOR
William C. McCoy.

March 12, 1929.   W. C. McCOY   1,705,158
ELECTRICAL INDICATING INSTRUMENT
Filed Jan. 21, 1926   2 Sheets-Sheet 2

INVENTOR
William C. McCoy.

Patented Mar. 12, 1929.

1,705,158

UNITED STATES PATENT OFFICE.

WILLIAM C. McCOY, OF CLEVELAND, OHIO, ASSIGNOR TO THE W. G. NAGEL ELECTRIC COMPANY, OF TOLEDO, OHIO, A CORPORATION OF OHIO.

ELECTRICAL INDICATING INSTRUMENT.

Application filed January 21, 1926. Serial No. 82,803.

This invention relates to electrical indicating instruments and it particularly contemplates an improved indicating instrument for use in remotely controlled indicating systems and for other analogous purposes.

One of the objects of this invention is to provide a moving vane instrument that is adapted for operation on either alternating or direct current and that is capable of accurately indicating conditions existing at a remote station independent of voltage variations in the transmitting circuit.

Another object of the invention is to provide an instrument having a relatively great torque and that has a very wide angular range of movement.

Other objects and advantages to be derived from practicing this invention will be apparent from the consideration of the accompanying drawings wherein:

Figure 1 is a diagrammatic top plan view of an instrument constructed in accordance with this invention, showing one of the actuating coils in section.

Fig. 2 is a side elevational view of the instrument shown in Fig. 1 with the actuating coils removed to more clearly illustrate the armature.

Fig. 3 is a sectional view of the armature taken substantially on line 3—3 of Fig. 1.

Fig. 4 is a top plan view, corresponding to the view shown in Fig. 1, of a modified form of instrument constructed in accordance with my invention.

Fig. 5 is a side elevational view of the armature removed from the remainder of the instrument shown in Fig. 4.

Fig. 6 is a sectional view of the armature taken substantially on line 6—6 of Fig. 4 and looking in the direction of the arrows.

Fig. 7 is a perspective view of a modified form of armature showing a method of constructing it.

Fig. 8 is a diagrammatic view of a control system adapted to be used with an indicator of the character herein shown; and Fig. 9 is a diagrammatic view of a modified form of control system adapted to be used in connection with the instrument shown.

Figure 10:
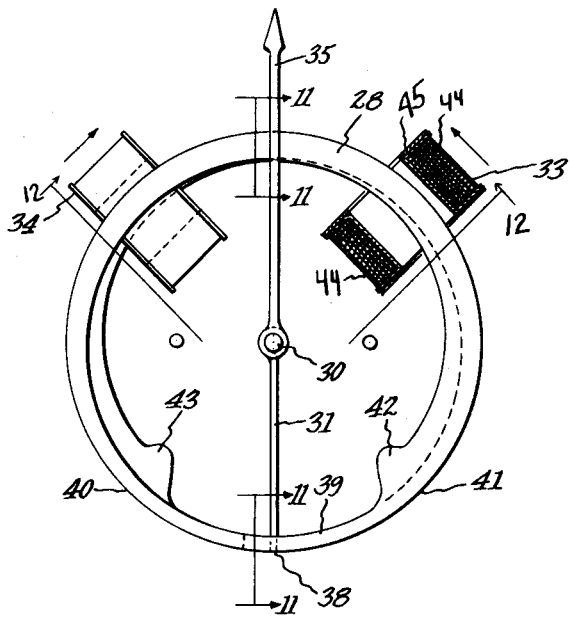
Fig. 10 is a top plan view, shown diagrammatically with one of the coils in section, of a further modification of the invention.

The form of instrument shown in Figs. 1, 2 and 3 of the accompanying drawings comprises a pivotally mounted armature structure 1 that has a pair of overlying spaced arms 2 and 3 of arcuate form that are respectively adapted to extend through and operate within differentially energized solenoid windings 4 and 5. The arms 2 and 3 of the armature are disposed in substantially parallel planes spaced a sufficient distance to permit the arms 2 and 3 to move freely within the openings of the overlying solenoid windings 4 and 5. Each of the arms 2 and 3 has a tapered portion 6 that terminates in an enlarged portion 7 of greater transverse cross-sectional area than other parts of the armature. The portions 7, which are preferably disposed at equal distances from a common supporting arm 8, are connected by tapered portions 9 and an inclined connecting portion 10 that joins the tapered portions 9, thereby magnetically connecting the arms 2 and 3 of the armature at the point of support of the armature. The portions of the armature may either be welded together and welded to the supporting arm 8 or otherwise securely carried thereby.

All portions of the armature are preferably formed of magnetic material except the pivotal supporting arm 8 that is formed of some suitable non-magnetic material. The connecting portion 10 of the armature is preferably integral with each of the arms 2 and 3, although this is not essential as will hereafter be explained. A pivot shaft 11 to which the pivot arm 8 is securely attached, pivotally supports the arms 2 and 3 in order that they may freely swing through the energizing solenoids 4 and 5 from the position in which the enlarged portion 7 of one of the arms is positioned at the center of magnetic intensity of one of the solenoids to the point where the other enlarged portion 7 is correspondingly positioned within the other solenoid winding. The degree of taper of the arms 2 and 3 may be modified to produce the desired form of scale graduation.

The end portions 6 of the armature structure are shown as terminating a sufficient distance from the connecting portion 10 to permit each arm of the armature to be threaded through the corresponding actuating coil.

The form of instrument shown in Figs. 1, 2 and 3 may conveniently be operated from either the control system diagrammatically shown in Fig. 9 or the system shown in Fig. 8, energized from either direct or alternating current source. Certain of the control systems shown in my copending applications Serial Nos. 653,104 and 1,299, respectively filed on June 23, 1923, and January 8, 1925, are also adapted to be used with the indicating instruments herein shown.

The control system illustrated in Fig. 9 comprises a storage battery 12 that energizes a resistance winding 13 that is traversed by a movable contact member 14 which is adapted to be adjusted to a multiplicity of positions depending upon the thing being indicated. A switch 15 that may also constitute a portion of the electrical circuit of an automobile or like mechanism, serves to connect the battery 12 in circuit with the remainder of the system.

From the above diagrammatic showing, in which only a portion of each of the magnetic arms 2 and 3 of the armature is shown in connection with the respective solenoid windings, it will be apparent that the movement of the contact member 14 from its extreme right-hand position to its extreme left-hand position will gradually decrease the energization of the winding 4 and increase the energization of the winding 5 until the solenoid winding 5 is energized to its maximum degree and the winding 4 is de-energized by a shunt connection established by the contact member 14. From a consideration of the diagrammatic control system thus described and the instrument structures previously described, it will be seen that each of the windings 4 and 5 exerts a draft on the corresponding armature arm that opposes the draft exerted on the other arm by the opposing solenoid winding. It will, therefore, be apparent that the armature will come to rest where these two forces balance, thereby providing an indicating position that is determined by the relation of the magnetizing currents traversing the respective windings 4 and 5 and the relative number of turns of the windings. The range of movement will be between the two extreme positions wherein the enlarged portion 7 of the arms 2 and 3 of the armature lies within the zone of greatest magnetic intensity of the corresponding energizing coil.

The control circuit shown in Fig. 8 is so designed that it will consume much less current than the control system shown in Fig. 9. The resistance element 13 of the control system shown in Fig. 8 is connected in series relation with the energizing winding 4 thereby causing all of the current traversing the rheostat to also traverse the winding 4. The movable contact member 14 traverses the resistance element 13 in substantially the manner described in connection with Fig. 9, except that the coil 5 becomes the actuating coil and coil 4 serves as a field coil exerting a draft on the armature in a direction opposing the draft exerted by coil 5 to a degree corresponding to the combined current flowing through the resistance element 13 and the winding 5. This will vary to considerable degree depending upon the position of the contact member 14. To compensate for changes in the energization in the field coil and the difference in current magnitude traversing the windings 4 and 5, for different settings of the contact member 14, the relation of the number of turns in the windings 4 and 5 may be so adjusted as to give the desired control of the armature. The relation of the electrical resistance of the winding 13 and the winding 5 may also be modified in accordance with the quantities that it is desired be indicated by the instrument. It may also be desirable to change the form or degree of taper of one arm of the armature relative to the other arm thereof in order to obtain certain desirable variations in the torque acting on one arm relative to the torque acting on the other arm.

Figs. 4, 5 and 6 illustrate a modified form of my invention wherein an armature ring 16 is spaced from a correspondingly formed ring 17, arranged in reverse position, by a non-magnetic supporting arm 18. Each of the armature elements 16 and 17 is transversely split as at 19, in order to facilitate introducing the armature into the opening through the solenoid winding, after mounting the armature elements within their respective solenoid windings, they may then either be again welded into complete magnetic rings or simply be soldered or otherwise secured to the non-magnetic support 18 with or without the associated end portions abutting.

Each of the armature portions 16 and 17, one of which directly overlies the other, has an enlarged portion 20 and tapered portions 21 and 22 of decreasing cross-section formed on each side of the corresponding enlarged portion. The enlargements 20 correspond to the enlarged portions 7 of the instrument shown in Figs. 1, 2 and 3. The actuating coils 4 and 5 of this instrument may be energized from either direct or alternating current through either of the control circuits shown in Figs. 8 and 9 as described in connection with the instrument illustrated in Figs. 1, 2 and 3.

In some instances, it may be desirable to space the solenoid windings 4 and 5, as by a non-magnetic spacer 24, in order to avoid too great a degree of magnetic interference between the windings.

Fig. 7 shows a method of forming an armature from a single piece of sheet iron, preferably soft iron such as customarily is used as a part of laminated bodies in electrical equipment. A stamping such as that shown in the broken outline, is first formed from the sheet of soft iron. The two arms 25 and 26 of the stamping thus formed are bent into cylindrical form to produce the correspondingly marked portions shown in solid outline. The connecting portion 26, that is integral with the arms 25 and 26, forms a magnetic connection between the overlying arms that carries the magnetic flux produced in one winding into the magnetic field produced by the other winding. Each of the arms has an enlarged portion 27 formed thereon that corresponds to enlarged portions 7 of the armature shown in Fig. 1.

Windings 4 and 5 are preferably energized to produce magnetic fields extending longitudinally through the armature in the same direction, thereby providing an armature in which one of the arms is always magnetically positive and the other arm is always magnetically negative. This relation of the magnetization of the two arms reduces errors in the instrument indications resulting from residual magnetism. The armature shown in Fig. 7 is adapted to operate within solenoid windings of the types 4 and 5 as previously described, the armature being pivotally supported in any desired manner.

The modified form of instrument shown in Fig. 10 to Fig. 13, inclusive, comprises a pair of pivotally mounted overlying armature portions 28 and 29 that are supported in spaced relation from a pivot shaft 30 by an arm 31 of non-magnetic material. The armature portion 28, which is shown as the upper armature portion of the instrument, threads actuating coil 33 and the lower or underlying armature portion 29 extends through actuating coil 34. The coils 33 and 34 are of substantially the same type of hollow core solenoid that is shown in connection with the instrument illustrated in Figs. 1, 3, 4 and 6, and are adapted to be energized in accordance with the same circuit relation except that the coils are preferably energized in opposed relation as indicated by the associated arrows. The common pivot shaft 30 that serves to support both of the armature portions 28 and 29 also carries an indicating arm 35 that is actuated to a plurality of indicating positions over a wide range of movement by the differential energization of coils 33 and 34.

A pivot shaft 30 is preferably supported in adjustable bearing sockets, the upper bearing member 36 preferably being a part of the instrument frame and the lower bearing member 37 being adjustable with respect to the bearing member 36.

The armature portions 28 and 29 are preferably stamped from sheet material of the type disclosed in Patent No. 1,551,136 that issued to Austen Curtis on August 15, 1925, and are each provided with a transverse separation in order that each of the armature portions may be threaded through the coil with which it is intended to operate. The armature portions herein illustrated are preferably separated transversely along the dotted line 38 and the armature portions welded or otherwise secured to the supporting arm 31. The abutting ends of the armature portions may also be united during the welding operation in order to provide ring shaped armature portions forming a complete magnetic circuit for the associated actuating coil. This insures the development of a very high actuating torque for the instrument. If the armature portions for either this type of instrument or for the other types of instruments described herein are formed of the material indicated above, the errors due to residual magnetism will be greatly reduced.

The upper armature portion is preferably of progressively increasing cross sectional area from a point 40 to a point 41 where it culminates in an enlarged portion 42 that operates substantially in the manner of enlarged portions 7 and 20 of the previously described instruments. The lower armature portion 29 has a correspondingly enlarged portion 43 and is preferably symmetrically arranged with respect to the overlying armature 28 and the pivot shaft. The two armature portions are preferably exactly similar.

Figure 11:
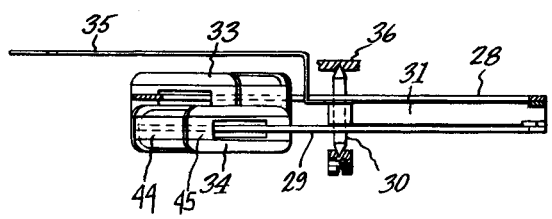
Fig. 11 is a side elevational view of the instrument shown in Fig. 10 with a portion of the armature removed for purposes of illustration and shown in section taken substantially along line 11—11 of Fig. 10.
Figure 12:
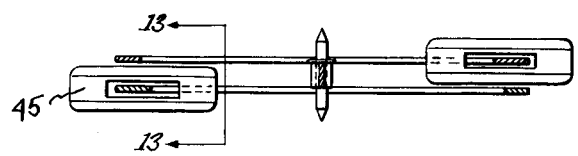
Fig. 12 is also a side elevational view, shown partially in section on the line 12—12 of Fig. 10.
Figure 13:
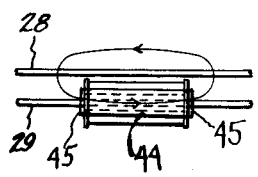
Fig. 13 is a side elevational view of one of the actuating coils and the associated armature portions shown apart from the remainder of the instrument.

The control system shown in Fig. 9 is well adapted for use in connection with the instrument shown in Figs. 10, 11 and 12. This instrument may be used on either direct or alternating current. Its operations is substantially the same as for the instruments previously described.

It will be noted that the armature 28 overlies and is spaced from the coil 34 in order that the return path of the magnetic flux of the coil 34 may include a portion of the armature 28 that extends through the coil 33. This same magnetic relation exists between the armature portion 29 and the coil 33. It will also be noted that the direction of the return magnetic flux for each of the windings is in the same general direction as the energizing flux for the armature portion influenced by the other winding. This magnetic relation between the two armatures and the associated actuating coils substantially maintains a constant degree of energization in each of the armatures for all instrument positions, thereby reducing errors that might develop in certain instrument applications because of residual magnetism remaining in the armature portions of the instrument.

This close relation of the overlying armature is particularly desirable for instruments of relatively large size in which the pivot bearings can be arranged to take care of such side thrust as might be developed.

For some forms of instruments, a narrow strip 44 of magnetic material may be arranged on each side of each actuating coil in order to increase the magnetic influence of the coil and to divert the return magnetic path for the actuating coil to zones where it will not materially influence the overlying or underlying portion of the armature. By arranging these magnetic strips on each side of each coil, the reluctance of the external magnetic circuit for the coil is materially reduced, and, for alternating current use, the reactance of the coil is greatly increased thereby reducing the energizing current. In some instances, the coil ends 45 may also be advantageously formed of magnetic material. The core of the spool on which the coil is wound must be formed of non-magnetic material.

Figure 14:
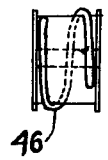
Fig. 14 is a detail view showing the modified form of actuating coil.

By changing the shape and location of the external magnetic sleeves or strips, the range of voltage and frequency with which a particular coil is used will be greatly increased, and the magnetic sleeves can be used to change the calibration of the instrument. The same result may also be accomplished by forming a series of turns of iron wire 46 about the respective coils to control their magnetic reluctance as shown in Fig. 14.

From the above description it will be apparent that an instrument constructed in accordance with any one of the several embodiments of this invention will have a materially greater range of movement than instruments formerly proposed, the widest desirable degree of movement being substantially 270° between extreme positions, although operative instruments of even greater range could be produced. Any convenient form of indicator may be used in connection with the armature.

It will be apparent that many additional modifications can be made in the details of the instruments herein shown without departing from the spirit and scope of this invention. It is, therefore, desired that only such limitations shall be imposed as are indicated by the spirit and scope of the appended claims.

What I claim is:

1. An electrical indicating instrument comprising a pair of pivotally mounted rigidly connected arms of magnetic material each overlying the other in spaced relation, a common pivotal mounting for said arms, a pair of solenoids having open centers through which said arms respectively extend in all operating positions, said solenoids being mounted to respectively actuate said arms in opposite directions, each of said arms being provided with an enlarged portion of increased magnetic property between connected portions of uniformly decreasing cross sectional area.

2. An electrical indicating instrument comprising a pair of hollow solenoids one overlying the other, a pivotally mounted armature of magnetic material having a pair of oppositely tapered arms one overlying the other and each of which is adapted to move within one of the solenoid windings, each of said arms being provided with a portion of greatly increased magnetic property integrally connected on each side with portions of gradually decreasing magnetic property, each of said armature portions being adapted to remain within its solenoid winding through all indicating positions of the instrument.

3. An electrical indicating instrument comprising a pair of hollow solenoids arranged in different elevations and in such manner that the axes of the two solenoids do not intersect, an armature structure comprising an arcuately formed portion of magnetic material of progressively increasing cross sectional area terminating in an enlarged portion of materially larger cross sectional area, and a second armature portion formed of magnetic material of progressively increasing cross sectional area terminating in a materially enlarged portion, said armature portions being supported in opposed relation from a common pivot mounting in order that one armature may increase progressively in cross sectional size in a direction in which the other armature decreases in cross sectional size, said solenoids being adapted to energize the associated armature portion in reverse direction relative to the other armature portion in order that the direction of energization of the underlying armature portion will be reversed with respect to the direction of energization of the upper armature portion 4. In an electrical indicating instrument, a pair of solenoids arranged with their axes in parallel relation, a pivotally mounted armature having a portion adapted to extend through one of the solenoids throughout the entire range of movement of the armature, and another portion adapted to extend within the other solenoid throughout the entire range of movement of the armature.

5. In an electrical indicating instrument, a pair of solenoids arranged in different elevation, an armature of sheet iron having arcuately formed portions, one of said portions extending completely through the center of one of said solenoids for all operative positions of the armature and the other of said portions extending completely through the other of said solenoids for all operative positions, each of said armature portions being tapered toward an enlarged portion.

6. In an electrical indicating instrument, the combination with a plurality of magnetizing coils, of a pivotally mounted armature having a plurality of superposed arms of magnetic material tapered in opposite directions from localized enlargements thereof and each of the arms acting in a different magnetizing coil, whereby the armature is moved to a multiplicity of different indicating positions by different relative degrees of energization of said coils.

In testimony whereof I affix my signature.

WILLIAM C. McCOY.